June 9, 1959 W. H. GILLE 2,890,334

ELECTRONIC INTEGRATORS

Filed Dec. 15, 1955

INVENTOR.
WILLIS H. GILLE

BY Frederick E. Lange

ATTORNEY

United States Patent Office 2,890,334

Patented June 9, 1959

2,890,334

ELECTRONIC INTEGRATORS

Willis H. Gille, St. Paul, Minn., assignor to Minneapolis-Honeywell Regulator Company, Minneapolis, Minn., a corporation of Delaware

Application December 15, 1955, Serial No. 553,337

9 Claims. (Cl. 250—27)

The present invention is concerned with precision electronic integrators for integrating time varying direct current potentials and particularly integrators of an improved resistance-capacity type which will integrate with extreme precision over extended periods of time.

In general, the operation of most basic RC integrators is satisfactory for relatively short periods after a signal potential to be integrated is applied. As the input signal current continues to flow through the RC integrating network tending to charge the capacitor, however, the potential developed across the capacitor soon becomes appreciable with respect to the input signal potential, and the charging rate of the capacitor decreases resulting in an increasing error in integrated output. Thus in basic RC integrators the usual practice is to utilize only the initial portion of the charging slope. It is apparent that if the initial current flowing through the RC network could be maintained throughout the period of integration the charging rate of the output capacitor C would be constant and a linear increase in output potential would be achieved, which would be proportional to the true integral of the input signal.

Applicant's invention provides an improved RC integrating apparatus which is superior to known RC integrators in accuracy and simplicity. In this invention the integrating capacitor C is made up of several capacitors connected in series. The input terminals of a D.C. amplifier are connected across the capacitors and the amplifer output is connected across the second of the capacitors. As the input signal current to be integrated begins to flow through the capacitors and a potential appears across the capacitors, this potential is applied to the amplifier input. The output from the D.C. amplifier is applied across the second capacitor in opposition to the potential across the first capacitor. The first and second capacitors develop potentials which are substantially equal in magnitude and opposite in polarity. The result is that the potential across both capacitors is always substantially zero, and the circuit will continue to integrate without error as long as the signal is applied to the integrator input, within the limits of the amplifier.

An object of the invention is to provide an improved electronic D.C. integrator of the RC type which provides a true integrated output over extended periods of time without error.

This and other objects of the invention will be understood upon consideration of the accompanying specification, claims and drawings of which:

Figure 1:
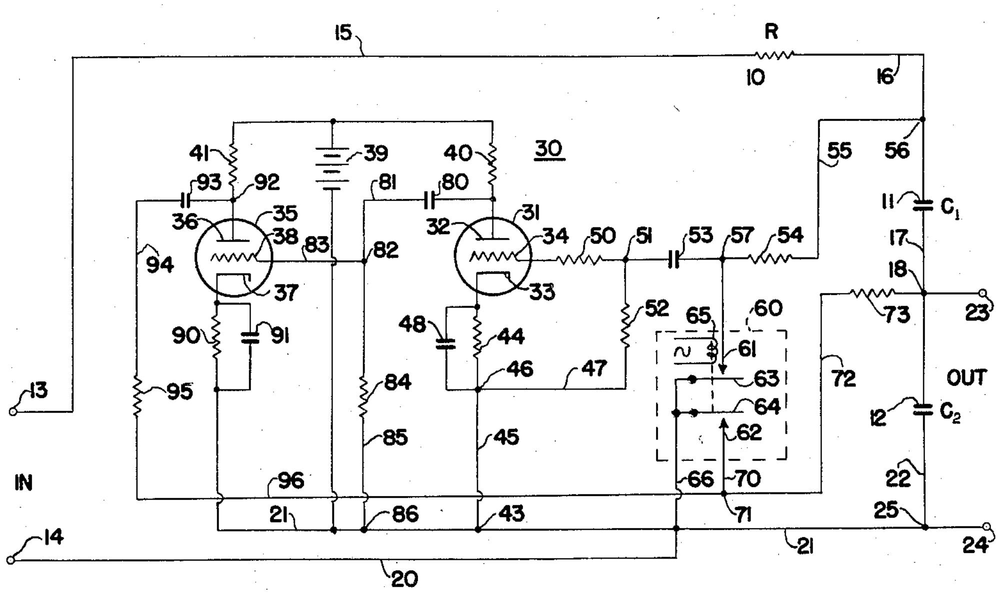
Figure 1 is a schematic representation of an embodiment of the invention.

Referring now to Figure 1, there is disclosed an RC integrator circuit having an integrating resistor 10 and integrating storage capacitors 11 and 12. The integrating resistor and capacitors are connected in series to an input signal at input terminals 13 and 14. A conductor 15 connects the input terminal 13 to a first terminal of the resistance 10. The opposite terminal of resistance 10 is connected to capacitor 11 by a conductor 16. A conductor 17 interconnects capacitors 11 and 12. The input terminal 14 is connected to the opposite terminal of capacitor 12 by conductors 20, 21 and 22. A pair of output terminals 23 and 24 are connected across the capacitor 12. Output terminal 23 is connected to the conductor 17 at a junction 18, and terminal 24 terminates conductor 21.

The integrator circuit includes an amplifier 30 having input terminals across the capacitors 11 and 12, and output terminals connected across capacitor 12. The amplifier includes a first stage of amplification, shown as a triode 31, and a second stage of amplification shown as a triode 35. Although triodes have been shown, tetrodes, pentodes, or any suitable amplifying device may be used. Triode 31 has an anode 32, a cathode 33 and a control electrode 34. Triode 35 includes an anode 36, a cathode 37 and a control electrode 38. The anodes 32 and 36 are connected to a source of potential 39 through resistors 40 and 41 respectively. Cathode 33 of triode 31 is connected to ground conductor 21 at a junction 43 by a cathode resistor 44 and a conductor 45. The control electrode 34 is connected to conductor 21 through a resistor 50, a junction 51, a resistor 52, a conductor 47 which is connected to a junction 46 on conductor 45, and through conductor 45 to the conductor 21. The junction 51 is connected through a capacitor 53, a resistor 54 and a conductor 55 to a junction 56 on conductor 16.

A junction 57 between capacitors 53 and resistor 54 is connected to a synchronous chopper 60. Synchronous chopper 60 has a pair of stationary contacts 61 and 62, and a pair of movable contactors 63 and 64 which make electrical contact with 61 and 62 respectively. A suitable source of alternating current energizes chopper winding 65 causing contact 63 to make with contact 61 for one-half cycle, and causing contact 64 to make with contact 62 during the succeeding half cycle. Movable contactors 63 and 64 are connected to ground conductor 21 by a conductor 66. Stationary contact 62 is connected to junction 18 on conductor 17 by a conductor 70, a junction 71, a conductor 72 and a resistor 73.

The anode 32 of triode 31 is connected to the grid 38 of triode 35 through a capacitor 80, a conductor 81, a junction 82 and a conductor 83. Control electrode 38 is connected to conductor 21 through the conductor 83, the junction 82, an extension of conductor 81, grid leak resistor 84, and a conductor 85 to a junction 86 on conductor 21. The cathode 37 is connected to conductor 21 through the cathode resistor 90, which has a bypass capacitor 91 connected to shunt the resistor. The anode 36 of triode 35 is connected to stationary contact 62 of the synchronous chopper 60 which connection can be traced from the anode to a junction 92, a capacitor 93, a conductor 94, a resistor 95, a conductor 96 to junction 71, and conductor 70 to contact 62.

*Operation of Figure 1*

In considering the operation of Figure 1, let us assume a signal potential, which is to be integrated, has just been applied to the integrator input terminals 13 and 14. A current path may be traced through the RC integrator, which path commences at input terminal 13, flows through conductor 15, resistor 10, conductor 16, capacitors C1 and C2, and conductors 22, 21 and 20 to the opposite input terminal 14. As the current continues to flow through the capacitors C1 and C2, tending to initiate a charge thereon, a minute potential will appear between the junctions 56 and 25, which is a measure of the potential across the total capacitance. The potential appearing at junction 56 is applied through a conductor 55 and a resistance 54 to the stationary contact 61 of the synchronous vibrator 60. The function of synchronous vibrator 60 is to convert the D.C. potential to a pulsating D.C. This is accomplished by the action of movable contactor 63 alternately making and breaking with stationary contact 61. The resultant pulsating D.C. potential at junction 57 is applied through isolating capacitor 53 and a current limiting resistor 50 to the grid 34 of triode 31. The potential applied to grid 34 is amplified by the conventional RC coupled two-stage amplifier 30. The amplified output signal appearing between conductor 21 and anode 36 of triode 35 is connected from the anode 36 through an isolating capacitor 93, a conductor 94, a resistor 95, and conductors 96 and 70 to the stationary contact 62 of synchronous chopper 60, for converting the alternating amplified output back to a D.C. potential. Since movable contactor 64 operates in synchronism with movable contactor 63 the alternate making and breaking of contactor 64 with fixed contact 62 reconverts the output of the amplifier to a D.C. component which has a polarity dependent upon the polarity of the signal applied to the input of the amplifier. The resultant D.C. output potential is applied from contact 62 through a conductor 72 and a resistance 73 to the junction 18, thereby connecting the amplifier output across capacitor C2. It will be noted that the potential applied across capacitor C2, from the amplifier, is opposite in polarity to the potential appearing across capacitor C1 due to the integrator input current.

As a further example of the operation let us assume a signal of ten millivolts is applied to terminals 13 and 14. The resulting current flowing through the resistance 10 and the capacitors 11 and 12 will result in the capacitors tending to become slightly charged. When a small potential in the order of a few microvolts, appears between junctions 56 and 25 due to the capacitor charge, this potential will be converted to an alternating potential by the synchronous chopper 60 and amplified by the amplifier 30. The amplified output from triode 35 will be reconverted to D.C. by the synchronous chopper 60 and applied across capacitor C2. The potential applied across capacitor C2 from the amplifier is opposite in polarity to the potential on capacitor C1 and that between junctions 56 and 25, thus reducing the potential applied as input to the amplifier. Since the sum of the potentials across the two capacitors C1 and C2 is substantially zero, the current flowing through R, C1 and C2 continues at its initial rate as long as the 10 millivolt signal is applied to input terminals 13 and 14. It is apparent that as capacitor C1 continues to charge and tends to increase the input potential applied to the amplifier, the amplifier output also increases keeping the voltage across capacitor C2 always of opposite polarity and substantially equal to the potential across capacitor C1. The limit of the integrator output is reached at the saturation point of the amplifier, which may be in the order of several hundred volts. Thus it is possible with applicant's invention to integrate any magnitude of input signal, and to continue integrating substantially without error to the limits of the amplifier.

The integrator output as shown is taken across capacitor C2, however, it may be possible under certain conditions to connect the integrator output terminals across capacitor C1 if desired.

The amplifier 30 has been shown as a two stage amplifier for purposes of simplicity of explanation, however, it is apparent that as many stages of amplification as is desired or required may be used. I have, for example, used with great success an amplifier having four stages.

Representative values of components which have been successfully used in one embodiment of this invention are as follows:

| | | |
|---|---|---|
| Resistor 10 | megohms | 5 |
| Resistor 40 | ohms | 470 K |
| Resistor 44 | do | 3.9 K |
| Resistor 50 | do | 2 K |
| Resistor 52 | megohms | 2 |
| Resistor 54 | megohms | 10 |
| Resistors 41, 95 | ohms | 100 K |
| Resistor 73 | megohm | 1 |
| Resistor 90 | ohms | 4.7 K |
| Capacitor 11 | microfarads | .5 |
| Capacitor 12 | do | .22 |
| Capacitors 48, 91 | do | 25 |
| Capacitors 53, 80, 93 | do | .05 |
| Battery 39 | volts | 450 |
| Tubes | | 12AV7 or 12AX7 |

Figure 2:
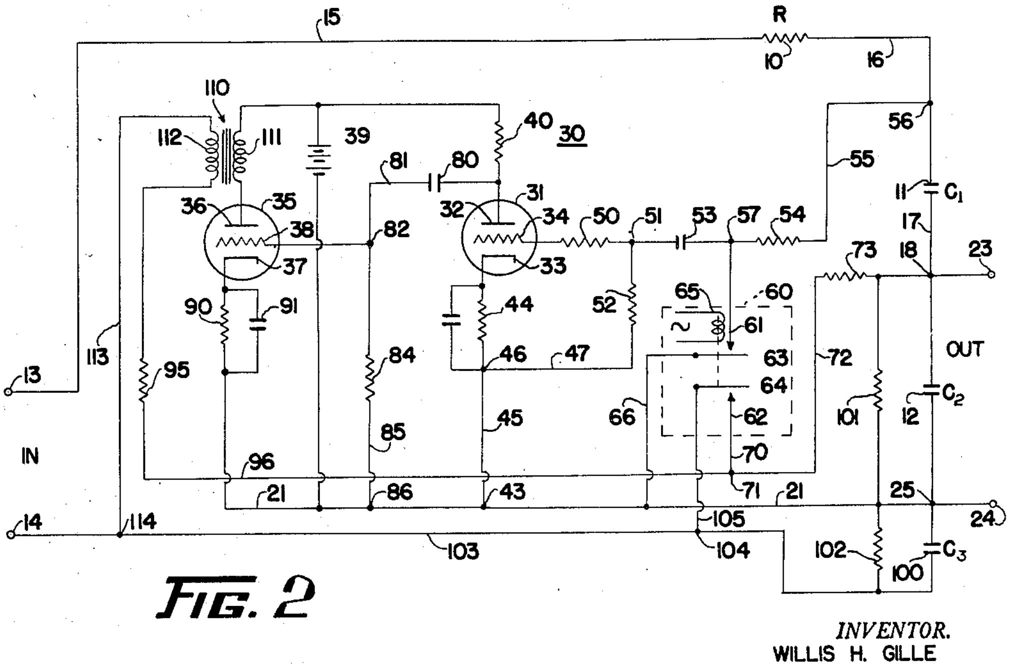
Figure 2 is a modification of Figure 1.

*Figure 2*

Figure 2 is a modification of Figure 1, and is especially useful where very small signals are to be integrated. In general, the identifying numerals of Figure 2 are identical with those of Figure 1 except where circuit changes have been made. The discussion of the components of Figure 2 will be limited to the differences between Figure 2 and Figure 1. A modification apparent immediately is that the capacitance portion of the RC network has been divided into three series connected capacitors C1, C2 and C3 instead of the two capacitors shown in Figure 1. Capacitor C3 is designated as 100. A pair of high impedance resistors 101 and 102 are connected in parallel respectively with capacitors C2 and C3. Input terminal 14 is connected by means of a conductor 103 to the lower extremity of capacitor C3 and resistance 102. The movable contactor 64 of synchronous chopper 60 is connected by a conductor 105 to the conductor 103 at a junction 104, and is electrically isolated from the movable contactor 63 rather than being directly interconnected as in Figure 1. In order to isolate the output signal of the amplifier 30 from the input signal, the load resistor 41 of Figure 1 has been replaced by an output transformer 110 having a primary winding 111 connected in the anode circuit of triode 35, and a secondary winding 112. One terminal of secondary winding 112 is connected by a conductor 113 to the conductor 103 at a junction 114. The opposite terminal of secondary winding 112 is connected through the resistor 95, conductor 96, junction 71 and conductor 70 to stationary contact 62 of synchronous vibrator 60. The transformer coupled output was used in Figure 2 since none of the input or output terminals of amplifier 30 may be common.

*Operation of Figure 2*

The modification of Figure 2 operates in most respects identical with Figure 1 with the exception that a limitation of Figure 1 at very low input signal levels has been overcome in the circuitry of Figure 2. The limitation of Figure 1 is due to the fact that the gain of the amplifier 30 is finite, so that it takes a definite magnitude of input signal to produce a given output. Let us, for ease of explanation, assume that the amplifier gain of Figure 1 is 1000. In that case to produce an output voltage from the amplifier of 100 volts, an input signal of .1 volt is required. The .1 volt input signal must appear across the extremities of capacitors C1 and C2. In our example this means integration has proceeded until capacitor C1 has 100.1 volts charge across it and capacitor C2 has 100 volts charge upon it.

Referring again to Figure 2 it will be noted that while the amplifier input is still connected to junctions 56 and 25, which are across capacitor C1 and C2, the amplifier output is applied across capacitors C3 and C2. The high impedance resistors 101 and 102 which are connected in parallel respectively with capacitors C2 and C3, have magnitudes which are of a ratio equal to the gain of the amplifier, which may be written $$\frac{R101}{R102}=\text{amplifier gain}$$

Let us again assume, as previously, that the gain of the amplifier is 1000. The amplifier still requires .1 volt of input to the amplifier to provide 100 volts of output. Let us also assume the integration of an input signal from terminals 13 and 14 has proceeded to the point where .1 volt exists across capacitors C1 and C2. This means the charge across capacitor C1 is now 100 volts; the 100 volt output of amplifier 30 is applied across capacitor C3 and C2 in opposition to the potential across capacitor C1. The resistances 102 and 101 proportion the potentials across capacitors C3 and C2 so that .1 volt appears across capacitor C3 and 99.9 volts across capacitor C2.

It should now be apparent that as long as the ratio of resistance 101 to 102 represents the gain of the amplifier, the sum of the voltage drops across capacitors C1, C2, and C3 will always be zero, from the initiation of the integrating action until saturation of the amplifier is reached. By maintaining the voltage drop across the capacity of the RC integrating circuit always substantially at zero the integrating current flowing through resistor 10 and the capacitors from the input terminals remains constant, and the capacitor C1 charges at a linear rate which is exactly proportional to the true integral of the input.

In general, I have shown certain specific embodiments of my invention and it is to be understood that this is for the purposes of illustration and that my invention is to be limited solely by the scope of the appended claims.

I claim:

1. An electronic integrating apparatus for integrating a direct current potential varying with time comprising: an electronic integrating network including resistance means and integrating storage capacitance means connected to a source of direct current potential varying with time, whereby said potential applied to said integrating network effects a charge on said capacitance means to develop an output voltage linearly proportional to the time integral of the potential; said integrating storage capacitance means comprising a pair of capacitors connected in series; direct current potential polarity inverting means having input and output terminals, said polarity inverting means including a current potential amplifier, said polarity inverting means providing an output potential of opposite polarity to the polarity of the input potential; means connecting said polarity inverting means input terminals across said capacitance means; and means connecting the output terminals of said polarity inverting means across one of said capacitors of said capacitance means such that said one capacitor is charged by the output of said polarity inverting means in opposition to the potential across said capacitance means, whereby said one capacitor of said capacitance means is charged with a potential of opposite polarity to that of the other series connected capacitor of said capacitance means.

2. An electronic integrating apparatus for integrating a direct current potential comprising: an electronic integrating network including in series resistance means and integrating storage capacitance means connected to a source of direct current potential, whereby said potential applied to said integrating network effects a charge on said capacitance means to tend to develop an output voltage linearly proportional to the time integral of the potential; said integral storage capacitance means comprising first and second capacitors connected in series; direct current potential polarity inverting means including a current potential amplifier having a predetermined voltage gain, said polarity inverting means having input and output terminals, said polarity inverting means providing an output potential of opposite polarity to the polarity of potential at the input terminals; means connecting said polarity inverting means input terminals across said first and second capacitors; means connecting said polarity inverting means output terminals across said second capacitor such that said second capacitor is charged by the output of said polarity inverting means whereby said polarity inverting means charges said second capacitor in polarity opposition to the potential of said first capacitor; and integrator output means connected to said capacitance means.

3. Electronic integrator apparatus for integrating a direct current potential varying with time comprising: a resistor; first and second storage capacitors; circuit means connected to a source of signal to be integrated, said circuit means comprising said resistor and said first and second capacitors connected in series; output means connected across one of said capacitors; polarity inverting electric means including current potential amplifier means capable of amplifying a direct current potential said polarity inverting means having input and output terminals and providing an output potential proportional in magnitude and opposite in polarity to the applied input potential; means connecting said polarity inverting means input terminals across said series connected capacitors; and means connecting said polarity inverting means output terminals across said second capacitor in a direction to charge said second capacitor oppositely to the direct current potential whereby the output potential of said polarity inverting means charges said second capacitor in polarity opposition to the amplifier input potential.

4. An electronic integrating system for integrating a direct current potential varying with time comprising: an electronic integrating network including integrating capacitance storage means, whereby application of said potential to said network effects a charge upon said capacitance means to develop an output potential from a portion thereof linearly proportional to the time integral of the potential; said integrating storage capacitance means comprising first, second and third series connected capacitors; integrator output means connected to one of said capacitors; direct current potential polarity inverting means comprising a current potential amplifier, said polarity inverting means having input and output terminals, said polarity inverting means providing an output potential opposite in polarity to the applied input potential; means connecting said polarity inverting means input terminals across both said first and second series connected capacitors; and means connecting said polarity inverting means output terminals across said second and third capacitors in a direction to charge said second and third capacitors oppositely to the first capacitor, whereby the output potential of said polarity inverting means charges said second and third capacitors in opposition to the direct current potential to be integrated.

5. An electronic integrating system for integrating a direct current potential comprising: an electronic integrating network including a resistor and integrating storage capacitance means connected to a source of direct current potential varying with time, whereby said potential applied to said network effects a charge on said capacitance means to develop an output voltage linearly proportional to the time integral of the potential; said integrating storage capacitance means comprising first, second, and third series connected capacitor means; integrator output means connected across one of said capacitor means; direct current potential electronic polarity inverting means including a current potential amplifier having a predetermined voltage gain, said polarity inverting means having input and output terminals; means connecting said polarity inverting means input terminals across said first and second capacitor means to amplify and invert the potential appearing across said capacitor means; means connecting said polarity inverting means output terminals across said second and third capacitor means such that the polarity applied from said polarity inverting means across said second and third capacitor means opposes the polarity on said first capacitor means; and second and third resistors connected in parallel respectively with said second and third capacitor means, the ratio in magnitude of said second resistor to said third resistor being equal to the predetermined gain of said amplifier, whereby the potential across said storage capacitance means remains constantly at zero potential throughout the period of integration.

6. Electronic integrator apparatus comprising: a source of signal providing an electrical output signal to be integrated; resistance means; first and second storage capacitance means; means connecting said resistance means and said first and second capacitance means in series to said source of signal; integrator output terminals connected across one of said capacitance means; polarity inverting means including amplifier means having input and output circuits and providing an output potential proportional in magnitude and opposite in polarity to the input potential applied; means connecting said polarity inverting means input circuit across said first and second capacitance means whereby said polarity inverting means is energized by the potential existing across said first and second capacitance means; and means connecting said polarity inverting means output circuit across said second capacitance means, so that the potential charge on said second capacitance means is opposite in polarity to the potential on said first capacitance means and said signal source.

7. Electronic integrator apparatus comprising: a source of time varying signal providing an electrical output signal to be integrated; resistance means; first and second storage capacitance means; means connecting said resistance means and said first and second capacitance means in series to said source of signal; integrator output terminals connected across one of said capacitance means; polarity reversing means including potential amplifier means, said polarity reversing means having input and output circuits, the polarity of the output potential of said polarity reversing means being opposite from the input potential polarity applied thereto; means connecting said polarity reversing means input circuit across said first and second capacitance means whereby said polarity reversing means is energized by the potential existing across said first and second capacitance means; and means connecting said polarity reversing means output circuit across said second capacitance means such that said second capacitance means is charged in polarity opposition to the potential charge on the series connected first capacitance means.

8. An electronic integrating system for integrating a direct current potential varying with time comprising: an electronic integrating network including integrating capacitance storage means whereby application of said potential to said network effects a charge upon said capacitance means to develop an output potential therefrom linearly proportional to the time integral of the potential; said integrating storage capacitance means comprising first, second and third series connected capacitors; direct current polarity inverting means including amplifying means having a predetermined voltage gain, said polarity inverting means providing an output potential proportional in magnitude and opposite in polarity to the input potential applied thereto, said polarity inverting means having input and output terminals; means connecting said polarity inverting means input terminals across said first and second capacitors such that the sum of the potential charge on said first and second capacitors is applied to said input terminals; and means connecting said amplifier output terminals across said second and third capacitors to charge said second and third capacitors in opposing relation to the charge on said first capacitor, whereby the sum of the potentials across said second and third capacitors is maintained opposite in polarity and equal in magnitude to the potential charge on said first capacitor.

9. An electronic integrating system for integrating a direct current potential varying with time comprising: an electronic integrating network including a resistor and integrating storage capacitance means connected to a source of direct current potential varying with time, whereby said potential applied to said network effects a charge on said capacitance means to develop an output voltage linearly proportional to the time integral of the potential; said integrating storage capacitance means comprising at least first and second series connected capacitors; integrator output means connected across one of said capacitors; polarity reversing means comprising first and second chopper means and electronic amplifying means having a predetermined voltage gain, said polarity reversing means having input and output terminals, said input terminals being connected across said first and second capacitors, said first chopper means being connected interjacent said input terminals and the input circuit of said amplifying means, said first chopper means being effective to periodically short the input circuit of said amplifying means and thus to convert the direct current signal at said input terminals to an alternating type signal to be amplified by said amplifying means, said second chopper means operating synchronously with said first chopper means and being connected interjacent the output circuit of said amplifying means and said polarity reversing means output terminals to provide an output potential proportional in magnitude but opposite in polarity to the input potential applied and means connecting said output terminals across at least said second capacitor, the output potential of said polarity reversing means charging said second capacitor so that the potential on said second capacitor is opposite in polarity to the signal potential source, whereby the potential across said storage capacitance means remains constantly at or near zero potential.

References Cited in the file of this patent

UNITED STATES PATENTS

| | | |
|---|---|---|
| 2,251,973 | Beale et al. | Aug. 12, 1941 |
| 2,463,553 | Olesen | Mar. 8, 1949 |
| 2,505,549 | Jones | Apr. 25, 1950 |
| 2,584,954 | Williams | Feb. 5, 1952 |
| 2,621,292 | White | Dec. 9, 1952 |
| 2,622,231 | Gray | Dec. 16, 1952 |
| 2,637,820 | McCreary | May 5, 1953 |
| 2,687,474 | Richmond | Aug. 24, 1954 |

FOREIGN PATENTS

| | | |
|---|---|---|
| 955,729 | France | July 4, 1949 |

OTHER REFERENCES

MIT Radiation Lab. Series, vol. 21, page 79.